United States Patent [19]

Dauwalder

[11] 3,963,065

[45] June 15, 1976

[54] MOUNTING BRACKET

[75] Inventor: Fred R. Dauwalder, Aurora, Ill.

[73] Assignee: Caterpillar Tractor Co., Peoria, Ill.

[22] Filed: May 1, 1975

[21] Appl. No.: 573,682

[52] U.S. Cl. .............................. 151/41.76; 29/150
[51] Int. Cl.² ......................................... F16B 39/00
[58] Field of Search............ 151/41.7, 41.75, 41.76; 52/758 F; 248/300; 29/150

[56] References Cited
UNITED STATES PATENTS 2,875,805   3/1959   Flora................................ 151/41.76

*Primary Examiner*—Ramon S. Britts
*Attorney, Agent, or Firm*—Phillips, Moore, Weissenberger Lempio & Strabala

[57] ABSTRACT

A strip of metal is formed into a bow-like member configured to capture a nut. The ends of the bow-like member define openings through which bolts may be disposed, to fix the bow-like member to a suitable frame or the like. The bow-like member defines yet another opening through which another bolt may be disposed to threadably engage with the nut, to secure the bow-like member to yet another frame or the like.

7 Claims, 2 Drawing Figures

MOUNTING BRACKET

BACKGROUND OF THE INVENTION

This invention relates to mounting brackets, and more particularly, to a mounting bracket which includes a captured or encapsulated fastener means portion such as a nut.

In a tractor incorporating a track roller frame and a guard assembly therefor, a series of threaded lugs are generally welded to the track roller frame, with such lugs defining respective apertures therein. The guard is then generally bolted to the track roller frame by means of a plurality of capscrews, each of which is disposed through an appropriate aperture in the guard assembly and threaded into the lug, to properly secure the guard assembly to the track roller frame.

While such apparatus has been found relatively effective in the mounting of such a guard assembly to a track roller frame, it is to be understood that the welding on and positioning of such lugs is a relatively time-consuming and difficult operation, requiring the work of a highly skilled workman at the site of the track roller frame and guard. It will, therefore, be understood that it is desirable to provide means for mounting a guard assembly to a track roller frame which can be more efficiently designed and produced for highly effective use thereof. It will also be understood that such mounting means should with advantage be applicable for use in a wide variety of environments.

SUMMARY OF THE INVENTION

It is accordingly an object of this invention to provide mounting means designed for providing a connection between, for example, a track roller frame and a guard assembly, meanwhile being extremely simple in design and construction, and effective in use.

It is a further object of this invention to provide mounting means which, while fulfilling the above object, are capable of being used in the connection of a wide variety of members.

Broadly stated, the invention comprises mounting bracket means comprising a bracket body, and a separate first fastener means portion, the bracket body being configured to generally capture the first fastener means portion to block removal of the first fastener means portion therefrom, the bracket body defining an opening through which access is allowed to the first fastener means portion to allow application thereto of a second fastener means portion.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
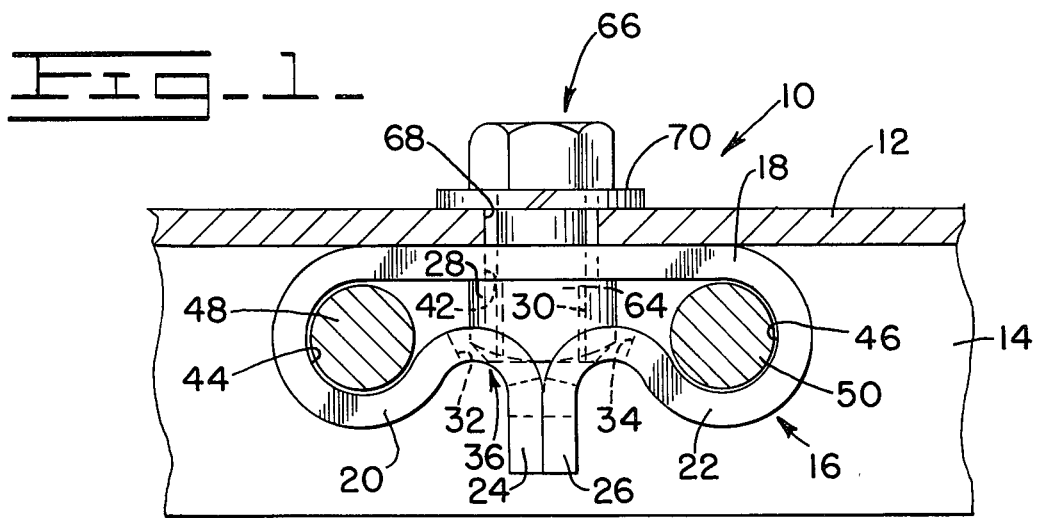
FIG. 1 is a plan view of the inventive mounting means, showing such mounting means in use.
Figure 2:
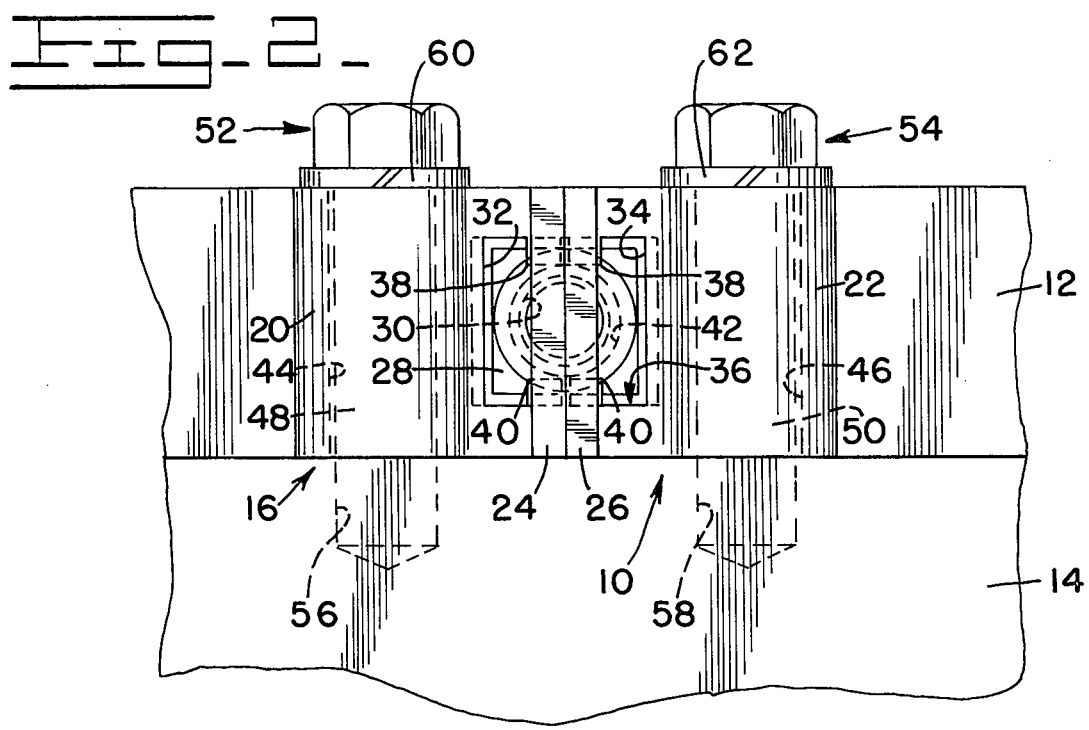
FIG. 2 is a side elevation of the mounting means of FIG. 1.

Shown in FIGS. 1 and 2 are mounting bracket means 10 for selectively interconnecting, for example, a guard assembly 12 and a track roller frame 14. The mounting bracket means include a bracket body shown at 16, made up of a substantially flat bracket body portion 18, curved bracket body portions 20,22 on either side of the substantially flat portion 18 and defining the ends of the bracket body, and a pair of extensions 24,26 extending from the respective curved portions 20,22 and disposed generally perpendicular to the substantially flat portion 18, extending in a direction generally away from the substantially flat portion 18.

A fastener means portion in the form of a nut 28 is disposed between the substantially flat portion 18 and the extended portions 24,26 as shown in FIG. 1. The nut 28 is of square configuration and defines an internally threaded bore 30, and appropriate openings 32,34 are provided in the curved portions 20,22 adjacent the nut 28 to define an overall opening 36 which is generally square in configuration, within which a portion of the square nut 28 is disposed. Because of the square shape of the nut 28 and the generally square configuration of the opening 36, it will be seen that the bracket body 16 and nut 28 cooperate to limit rotative movement of the nut 28 about the longitudinal axis of the threaded bore 30 thereof relative to the bracket body 16. Such configuration of the opening 36 and the nut 28 also limits movement of the nut 28 relative to the bracket body 16 generally along the substantially flat portion 18.

Each extended portion 24,26 defines upper and lower tabs 38,40 adjacent the front face of the nut 28, for limiting movement of the nut 28 generally along the longitudinal axis of the threaded bore 30 thereof.

It will be seen that through the above-described structure, the nut 28 is captured or encapsulated by the bracket body 16, so that the bracket body 16 blocks removal of the nut 28 therefrom.

The substantially flat bracket body portion 18 defines an opening 42, and the curved bracket body portions 20,22 on either side of the substantially flat portion 18 define openings 44,46, these openings 44,46 being disposed on either side of the opening 42. The longitudinal axis of the opening 42 is substantially perpendicular to the longitudinal axis of the opening 44 and the longitudinal axis of the opening 46.

In the use of the device, the mounting bracket means 10 made up of the body 16 and the nut 28 captured thereby is appropriately positioned relative to the guard assembly 12 and track roller frame 14, and the threaded shaft portions 48,50 of bolts 52,54 may be disposed therethrough and brought into threaded engagement with suitable tapped holes 56,58 in the track roller frame 14. Lock washers 60,62 may be used in cooperation with such bolts 52,54 and the curved portions 20,22 as appropriate. The threaded shaft 64 of yet another bolt 66 may be disposed through an opening 68 defined by the guard assembly 12, through the opening 42 defined by the substantially flat portion 18, which allows access to the nut 28, and into threaded engagement with the threaded bore 30 of the nut (which may be a lock nut). A lock washer 70 may be used between the head of the bolt 66 and the guard assembly 12 as appropriate, and the bolt 66 is tightened to secure the bracket body 16 to the guard assembly 12. As the nut 28 rotation relative to the bracket body 16 is limited by the shape of the nut 28 and the opening 36, it will be understood that the tightening of such bolt 66 is a quite easy and convenient matter.

It will be seen that the assembly made up of the bracket body 16 and nut 28 may be formed in an area remote from the actual area where the guard assembly 12 and the track roller frame 14 are situated. The bracket body 16 may initially exist in the form of an elongated flat metal strip defining appropriate apertures and cut-out portions therein, and such strip is then bent to the shape shown in FIG. 1 to capture the nut 28 therewithin. The pair of tapped holes 56,58 in the track roller frame 14 and the hole 68 in the guard assembly 12 need only be appropriately provided, and the assembly made up of the bracket body 16 and nut 28 may be easily and conveniently brought to the area of the track roller frame 14 and guard assembly 12, for use in connecting them. It will also be seen that welding steps are completely avoided in the use of such apparatus for mounting the guard assembly 12 to the track roller frame 14.

It is to be understood that such mounting bracket means 10 can be used for connecting any two elements as appropriate, and the use thereof is not limited to the mounting of a guard assembly to a track roller frame.

What is claimed is:

1. Mounting bracket means comprising a substantially flat bracket body portion, a separate first fastener means portion, a pair of curved bracket body portions on either side of said substantially flat bracket body portion and defining respective openings therethrough, bolt fastener means disposed through said respective openings, and means for capturing said first fastener means portion within said mounting bracket means comprising a pair of extension portions extending toward each other from the respective curved bracket body portions so as to captively and non-rotatably hold thereby said first fastener means portion between said flat bracket body portion and said extension portions.

2. The mounting bracket means of claim 1 wherein the substantially flat bracket body portion defines an opening positioned relative to the first fastener means portion so that a second fastener means portion may be disposed therethrough to selectively engage with said first fastener means portion.

3. The mounting bracket means of claim 2 wherein the longitudinal axis of the first opening is substantially perpendicular to the longitudinal axis of the said respective openings defined by said curved body portions.

4. The mounting bracket means of claim 2 wherein the first fastener means portion comprises a non-circular nut defining an internally threaded bore, and wherein the second fastener means portion comprises a threaded shaft to selectively threadably engage with the threaded bore of said nut.

5. The mounting bracket of claim 4 wherein the means for capturing said first fastener means portion further comprises the defining of the position of said extensions to be in juxtaposition with one another and defining a nut receiving recess therebetween having a shape corresponding to that of the nut, one end of said nut being positioned within said recess with its opposite end abutting the substantially flat bracket body portion to captively retain said nut within said mounting bracket means.

6. Mounting bracket means comprising a substantially flat bracket body portion, said bracket body portion defining a first opening, a noncircular nut defining an internally threaded bore, wherein said first opening is positioned relative to the nut so that a threaded shaft may be disposed therethrough to selectively threadably engage the threaded bore of said nut, a pair of curved bracket body portions on either side of the substantially flat bracket body portion defining second and third openings, wherein the longitudinal axis of the first opening is substantially perpendicular to the longitudinal axis of the second opening and the longitudinal axis of the third opening, and a pair of extensions extending from the respective curved bracket body portions and disposed in juxtaposition with one another generally perpendicular to the substantially flat bracket body portion, and extending in a direction generally away from the substantially flat bracket body portion, said extension defining a nut receiving recess therebetween having a shape corresponding to that of the nut, one end of said nut being positioned within said recess with its opposite end abutting the substantially flat bracket body portion to captively retain said nut within said mounting bracket means.

7. The method of generating a mounting bracket from a flat plate configured so that it captures a nut in a position relative to an opening in the bracket for the purpose of affixing the bracket to a separate body via a threaded bolt along one axis, and configured such that two bores are created perpendicular to the longitudinal axis of the nut bore for enabling the bracket to be affixed to a second separate body via two more bolts, said bracket generating method comprising the steps of:

providing an opening in a flat bracket plate;
placing a nut, having a defined threaded bore therein, relative to said opening so that a threaded bolt may pass therethrough;
bending the flat bracket plate on both sides of an opening to define bolt fastener bores; and,
bending a further portion of each of the brackets such that the two ends become juxtaposed, and such that said nut is captively and non-rotatably held therein.

* * * * *